Oct. 23, 1956 W. SPEARS 2,767,933
STRIP HANDLING APPARATUS
Filed Dec. 16, 1952 5 Sheets-Sheet 2

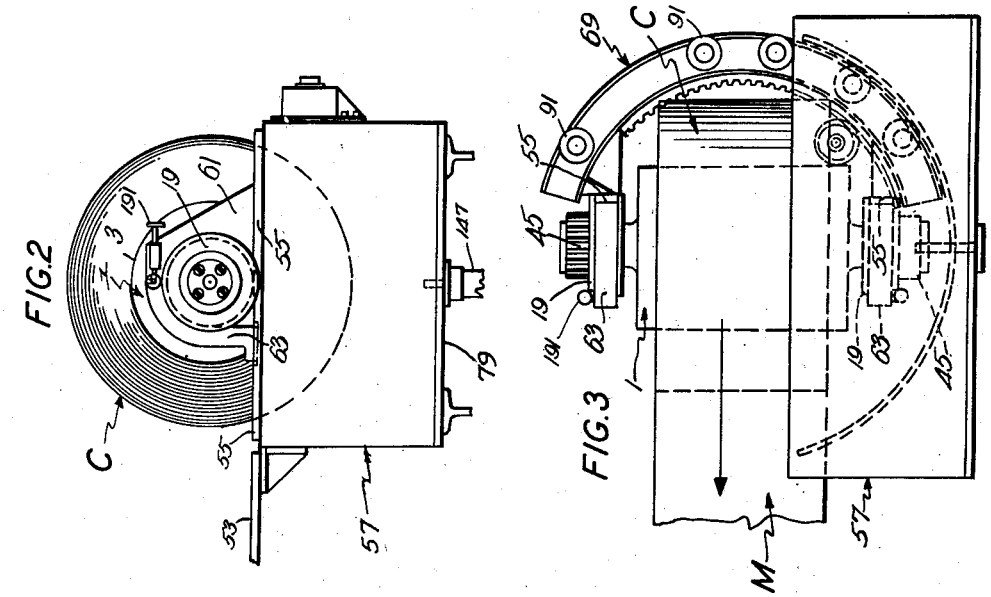

INVENTOR
WILLIAM SPEARS
BY Emery Booth Townsend
Miller & Weidner ATT'YS.

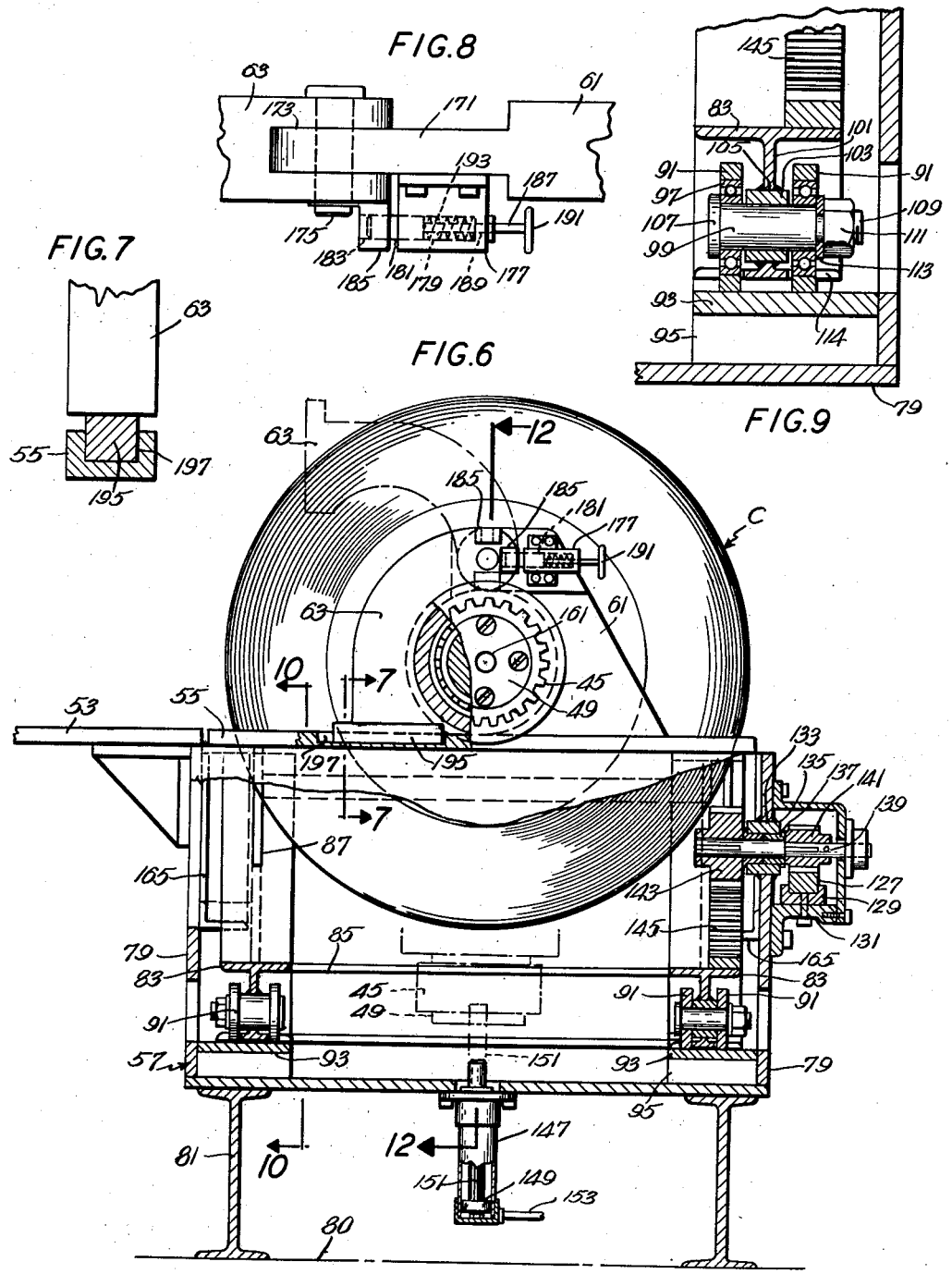

Oct. 23, 1956 W. SPEARS 2,767,933
STRIP HANDLING APPARATUS
Filed Dec. 16, 1952 5 Sheets-Sheet 4

INVENTOR
WILLIAM SPEARS
BY
ATT'YS.

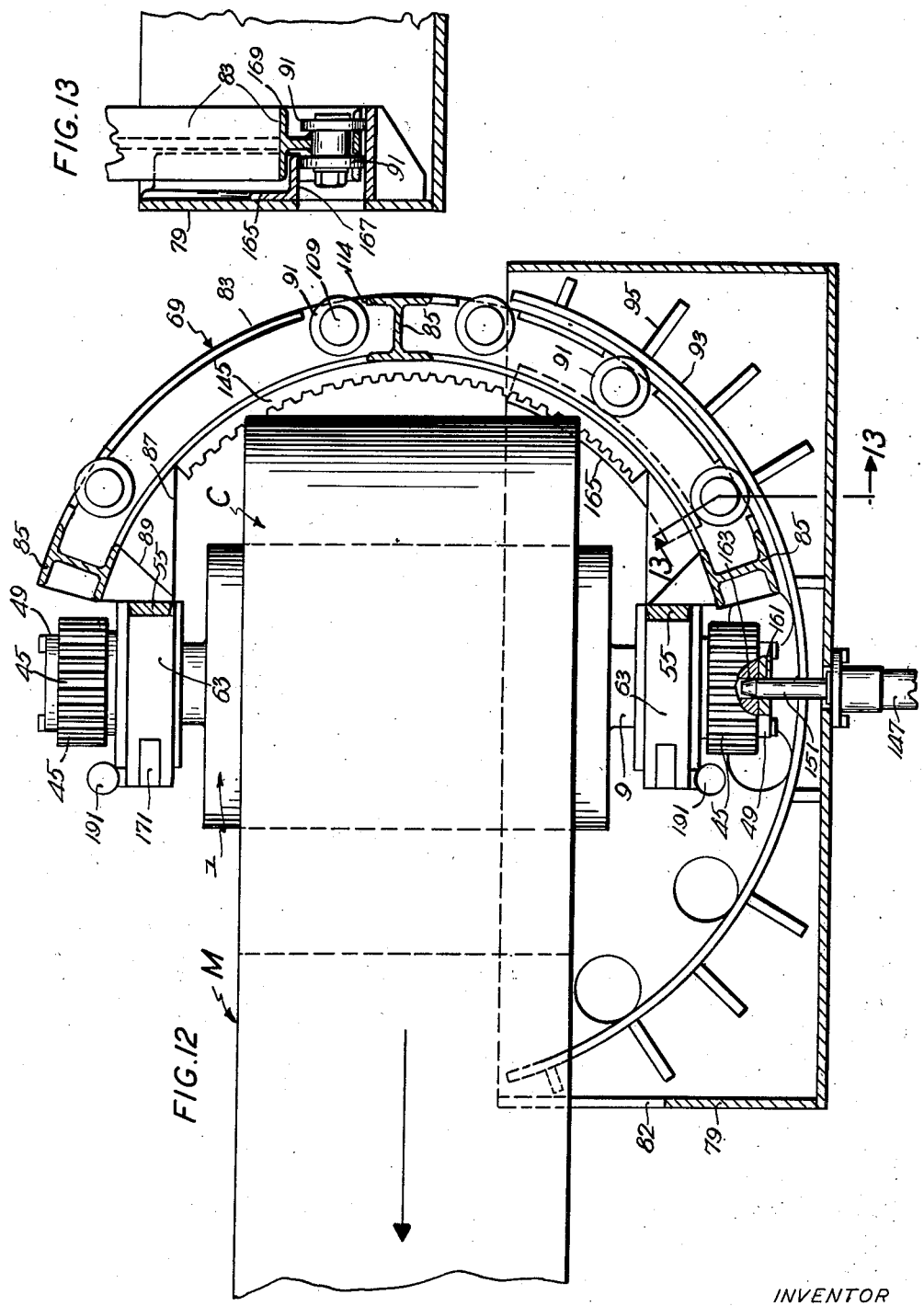

United States Patent Office 2,767,933
Patented Oct. 23, 1956

2,767,933

STRIP HANDLING APPARATUS

William Spears, Glen Ellyn, Ill., assignor to Revere Copper and Brass Incorporated, New York, N. Y., a corporation of Maryland Application December 16, 1952, Serial No. 326,270

15 Claims. (Cl. 242—79)

My invention relates to metal strip handling apparatus. The invention has among its objects an improved apparatus for receiving a spool wound with a coil of metal strip and upending it, with provision for paying the strip off the spool when the latter is upended. These and other objects of the invention will be best understood from the following description when read in the light of the accompanying drawings, while the scope of the invention will be more particularly pointed out in the appended claims.

In the drawings:

Fig. 1 is a side elevation of apparatus according to the invention more or less schematically showing the upender in position to receive a spool wound with a coil of the strip, parts being omitted, and with parts in section;

Fig. 2 is a view, corresponding to Fig. 1, showing the wound spool received by the upender and secured thereto;

Fig. 3 is a view, corresponding to Figs. 1 and 2, showing the wound spool in upended position with the strip being payed off;

Fig. 4 is a more or less schematic side elevation of winding mechanism for a spool according to the invention, showing such a spool applied thereto;

Fig. 6 is a section on the line 6—6 of Fig. 5;

Fig. 7 is a fragmentary section on the line 7—7 of Fig. 6 on an enlarged scale;

Fig. 8 is a fragmentary view showing a detail;

Fig. 9 is a view showing a fragment of Fig. 6 on an enlarged scale;

Fig. 12 is a section on the line 12—12 of Fig. 6 with the parts in different operative positions, and with parts omitted; and Fig. 13 is a section on the line 13—13 of Fig. 12, with parts omitted.

Figure 11:
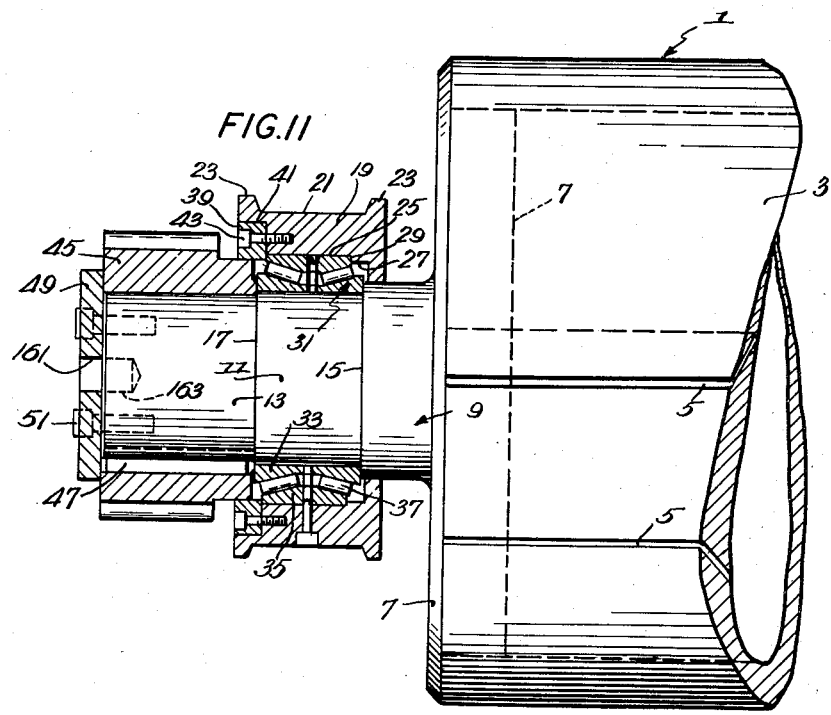
Fig. 11 is a section on the line 11—11 of Fig. 5, on an enlarged scale, and with parts in elevation.

Referring particularly to Figs. 1, 2, 3 and 11, the spool 1 as illustrated comprises a hollow drum 3 on which the strip M is wound under tension to form the coil C, the drum being provided with suitable means for securing the inner end of the strip thereto as, for example, is provided with an inclined slot 5 shown in Fig. 11, into which slot the end of the strip is adapted to be inserted preliminary to winding it on the drum to form the coil. Two such slots may be provided as shown in Fig. 11, one slot being inclined in the opposite direction from the other, so that the strip may be wound by rotating the spool in a given direction independently of the direction in which a given end of the spool faces.

At each of its opposite ends the drum 3 of the spool is shown as provided with a head 7 which integrally carries, and from which axially projects, a cylindrical axle or spindle 9. Each axle has portions 11 and 13 of progressively reduced diameter as the axle extends outwardly from the head so as to provide the axle with the annular shoulders 15 and 17. Rotatably mounted on each of these axles is a wheel 19 having the cylindrical track engaging surface 21, and, at opposite sides thereof, the peripheral flanges 23.

As shown, each wheel 19 is provided with a bore 25 having adjacent one end thereof a reduced diameter portion 27 which provides the bore with an annular shoulder 29. Within the bore is removably fitted a roller bearing 31 having the inner race 33 and outer race 35 between which are placed the rollers 37. Each roller bearing, as clearly illustrated in Fig. 11, has two series of these rollers placed between oppositely inclined bearing surfaces, respectively, on the races, so that the roller bearing serves as a thrust bearing for loads exerted axially of the spool as well as a bearing for loads exerted transversely of the spool.

In the construction illustrated the outer race 35 of the roller bearing at one end bears against the shoulder 29 of the bore 25 of the wheel and at its opposite end against a ring 39 received in the enlarged diameter portion 41 of that bore, this ring being secured to the wheel by screws 43. The inner race 33 of the roller bearing at one end bears against the annular shoulder 15 on the axle 9, and, at its opposite end, against a gear-like member 45 which fits the reduced diameter portion 13 of the axle and is non-rotatably secured thereto by a key 47. This member 45 at one end bears against the annular shoulder 17 of the axle and is held against it and the adjacent end of the inner race 33 by a disk-like plate 49 removably secured to the end of the axle by screws 51. By this construction the outer race is held against axial movement relative to the wheel, and the inner race 33 against axial movement relative to the axle.

The wheels 19 of spools 1 wound with coils C may be placed on spaced tracks 53, as indicated in Fig. 1, and rolled onto aligned spaced tracks 55 of a spool upender 57. Each track 55 of the upender, as indicated in Fig. 1, carries a clamping device 59 comprising a member 61 fixed to the track and a member 63 hingedly carried by the member 61. Each member 61 has a concave surface portion 65 for engaging part of the circumferential surface 21 of the wheel 19 when the latter is against such member, while each member 63 has a concave surface portion 67 for engaging an opposite part of said circumferential surface. When the spool is rolled onto the tracks 55 to place the wheels against the concave surfaces of the members 61 the members 63 may be swung downwardly into engagement with the wheels and tracks and may be secured in that position for clamping the wheels to the tracks as indicated in Fig. 2.

The upender, as indicated in Fig. 3, carries a cradle 69 mounted therein for rocking movement, which cradle carries the tracks 55. When the wheels 19 of the spool are clamped to these tracks the cradle may be rocked about a horizontal axis above the level of said tracks from its position shown by Fig. 2 to its position shown by Fig. 3 for upending the coil, and, the drum portion of the spool being rotatably secured to the wheels, the strip M of the coil may be payed off when the latter is in such upended position.

When the coil is entirely unwound the spool may be transported in any convenient way to a coil winding device 71 schematically shown in Fig. 4, the tracks 53 conveniently terminating at one end at this winding device and at their other ends at the upender. The tracks 53 at the winding device may be provided with clamping devices 59 like those employed at the upender. When the wheels are clamped to the tracks at the winding device the gear-like member 45 at one end of the spool serves as one element of a clutch, the other element of which is presented by the internal gear-like member 73. This member 73 may be splined to a driving shaft 75 and may be moved into and out of engagement with the gear-like member 45 by shift mechanism, schematically illustrated at 77, so as to cause the shaft 75 to drive the spool and wind the strip on it under tension as, for example, as the strip comes from the rolling mill. After the coil is wound it may be rolled along the tracks 53 to the upender. Each end of the spool is conveniently provided with a gear-like member 45 so as to make it immaterial which end of the spool is presented to the internal gear-like member 73 splined to the driving shaft 75 of the coil winding device.

Figure 10:
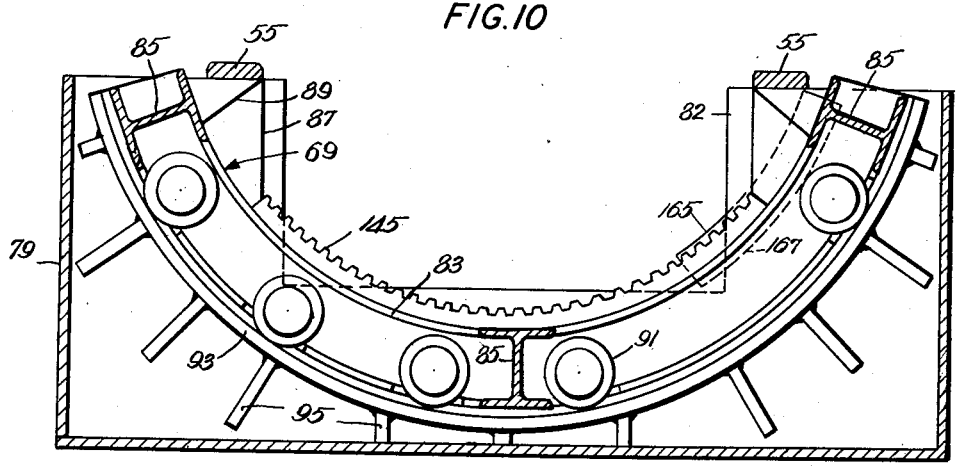
Fig. 10 is a section on the line 10—10 of Fig. 6, with parts omitted.

The upender 57, as illustrated (see Figs. 5 to 11) comprises an open top box-like casing 79 suitably supported as, for example, by resting on I-beams 81 carried by a foundation 80 as shown in Fig. 6. As further illustrated, one of the vertical walls of the casing is provided with an opening 82 (Figs. 10 and 12) extending downward from its upper edge for permitting passage of the spool and coil when being placed on the cradle 69 and permitting passage of the strip when being payed off from the coil when the spool is in its upended position. The cradle is mounted within this casing. As shown, the cradle comprises spaced arcuate lengths of I-beams 83 positioned at opposite sides thereof, these I-beams being rigidly connected to each other at opposite ends thereof and at an intermediate portion of their lengths by straight lengths of I-beams 85, the latter at their ends abutting and being welded to the arcuate I-beams. The tracks 55, as shown, are carried by plate-like brackets 87 and 89 to which the tracks are welded, the brackets 87 being welded to and carried by the arcuate I-beams 83, and the brackets 89 being welded to and carried by those I-beams 85 which connect the ends of the opposite arcuate I-beams 83.

The cradle is shown as supported for rocking movement by the rollers 91 which run on the arcuate tracks 93 carried internally of the casing 79. As shown, these tracks 93 are supported by plate-like brackets 95 welded thereto and to the adjacent walls of the casing. As best shown in Fig. 9, the rollers 91 are supported on anti-friction bearings 97 carried by the pins 99, the rollers being arranged in pairs with the rollers of each pair positioned at opposite sides, respectively, of the web 101 of the arcuate I-beams 83. These pins, as shown, extend through bushings 103 inserted in openings 105 in the web 101, to which web they are fixedly secured by welding, each pin having at one end thereof a head 107 which engages the adjacent anti-friction bearing, and, at its opposite end, having a reduced diameter screw-threaded portion 109 carrying a nut 111 which engages a washer 113 bearing against the opposite anti-friction bearing, the clearance between the ends of the bushings 103 and the anti-friction bearings being small to minimize end play of the rollers. As further shown, the lower flanges of the arcuate I-beams 83 are notched, as indicated at 114, to permit the rollers to extend to below said flanges so that they may bear against the tracks 93.

For moving the cradle from its spool receiving position shown by Figs. 1, 2 and 6 to its spool upended position shown by Figs. 3 and 12 an air, hydraulic or other pressure fluid cylinder 115 (Fig. 5) is provided, this cylinder being fixedly carried by a bracket 117 fixedly carried by the upender casing 79. The cylinder is double acting, a manually actuated four-way valve 119 and pipes 121 connecting such valve to opposite ends of the cylinder being provided for alternately connecting opposite ends of the cylinder to a compressed air or other pressure fluid supply pipe 122 also connected to said valve, the valve in each case connecting the opposite end of the cylinder to the atmosphere or other place of disposal of the pressure fluid exhausted from the cylinder. In this way the piston 123 in the cylinder may be caused to make its strokes in opposite directions, and to be maintained at the ends of said strokes until the valve is again operated to reverse the connections of the ends of the cylinder to the pressure fluid supply pipe and the atmosphere or other place of disposal of the exhausted pressure fluid, all as will be well understood by those skilled in the art.

As shown, a piston rod 125 of the cylinder 115 at one end thereof is connected to the end of an elongated rack 127 which is mounted for reciprocation on an elongated guide 129, this guide being fixedly carried by a bracket 131 (Fig. 6) fixedly secured to the adjacent wall of the casing 79. Extending through an opening 133 in the wall of the casing 79 adjacent the rack is a bushing 135, this bushing being fixedly secured to the casing by welding it thereto. Interiorly of the bushing are bearing sleeves 137 which rotatably support a spindle 139, this spindle fixedly carrying at the outer side of the casing 79 a pinion 141 meshing with the rack 127, and, at the inner side of the casing, fixedly carrying a pinion 143 meshing with an arcuate rack 145 fixedly carried by the adjacent arcuate I-beam 83 of the cradle.

In an obvious manner when the piston 123 is caused to make its stroke in one direction the cradle will be rocked in one direction for moving it from its spool receiving position shown by Figs. 2 and 6 to its spool upended position shown by Figs. 3 and 12, and, when the piston is caused to make its stroke in the opposite direction, the cradle will be rocked for moving it back to its first mentioned position. The length of the strokes of the piston 123 is such that the cradle will be in its spool receiving position when the piston is at one end of its stroke in one direction and will be in its spool upended position when the piston is at the end of its stroke in the opposite direction.

By maintaining the pressure in the cylinder 115 when the piston 123 is at the ends of its strokes the cradle will be held in the extreme positions of its movement. However, to insure that no substantial movement of the spool will occur when it is in its upended position and while the strip is being payed off the coil, the bottom wall of the casing 79 is shown as carrying an air or other pressure fluid cylinder 147 (Figs. 1, 6 and 12). This cylinder 147, which is positioned vertically, contains a reciprocatory piston 149 the piston rod 151 of which, when compressed air or the like is supplied to the lower end of the cylinder, is moved upward from its full line position shown by Fig. 6 to its dotted line position shown by that figure, and when the compressed air or the like is exhausted from the lower end of the cylinder will return by gravity to that end. For the purpose of admitting compressed air or the like to and exhausting it from the lower end of the cylinder 147 a pipe 153 is connected to that end, this pipe as schematically shown by Fig. 1 leading to a three-way valve 155 adapted to be manually operated by the valve handle 157, the valve being connected to a source of compressed air or other pressure fluid by a pipe 159. By manipulation of the valve handle the pressure fluid may be admitted to the pipe 153 from the pipe 159 and hence to the lower end of the cylinder, or may be exhausted from that end to the atmosphere or the like, all in a way that will be clearly understood by those skilled in the art. Each plate 49 at the end of the axle or spindle 9 of the spool is provided with an opening 161 (see Figs. 11 and 12) and the axle with an aligned opening 163, both openings being coaxial with the spool. When the spool is in its upended position, and compressed air or the like is admitted to the lower end of the cylinder 147 to raise the piston rod 151, it will enter this opening of the plate and aligned opening in the axle as clearly shown by Fig. 12 to act as a bolt for insuring that the spool is locked in its upended position while permitted to rotate relative to such piston rod.

Figure 5:
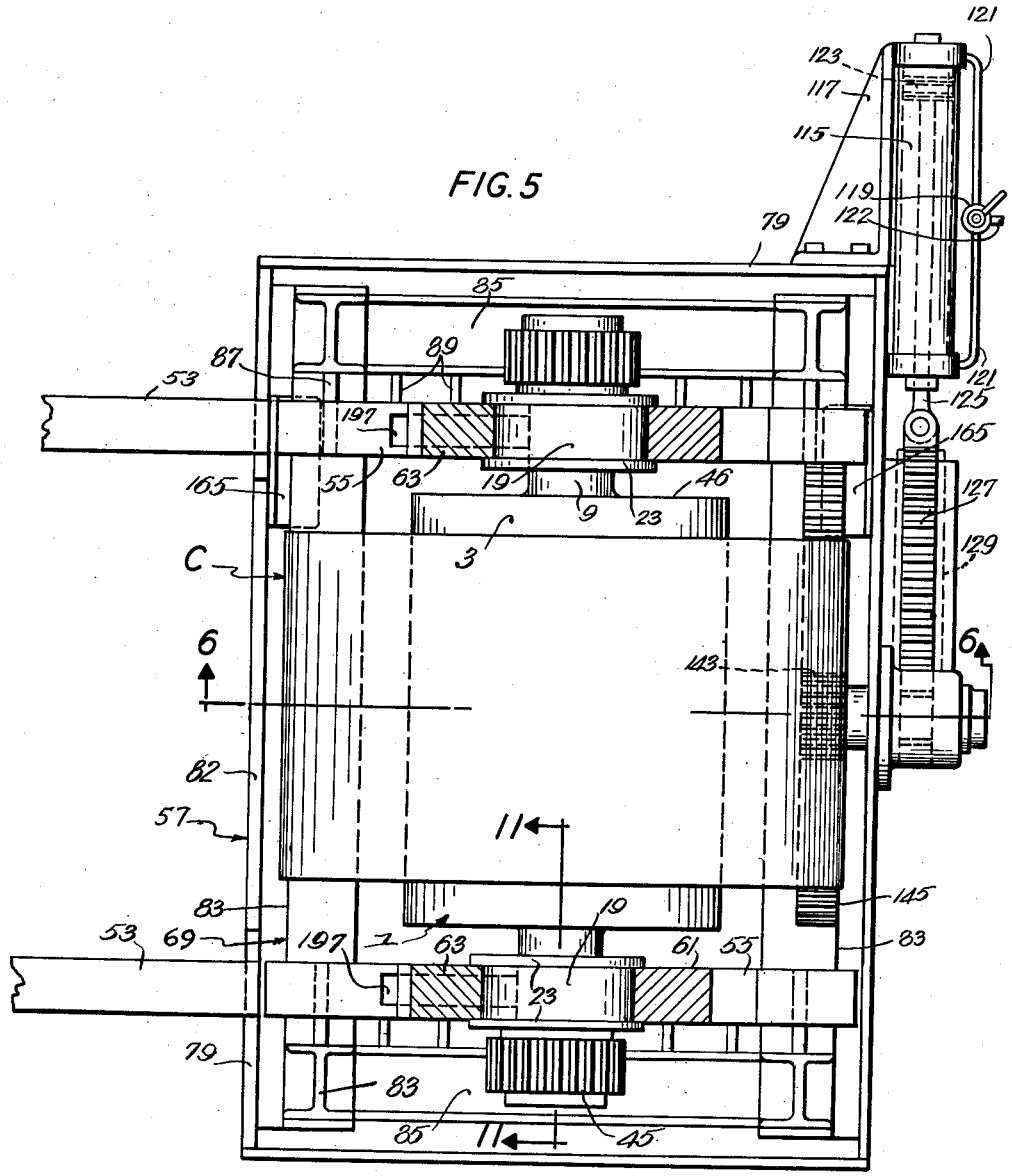
Fig. 5 is a plan of the apparatus according to Figs. 1 to 3 with the coil received in the upender and secured thereto prior to the coil being upended, on an enlarged scale, and with parts broken away.

For steadying the cradle against movement tending to lift the rollers 91 from engagement with the tracks 93 when the cradle is in its upended position shown by Fig. 12, the inner wall of the casing 79 adjacent each of the arcuate I-beams 83, as best shown by Figs. 5, 12 and 13, carries an arcuate length of angle-iron 165 arranged parallel to the adjacent arcuate I-beam. As shown, these angle-irons have flanges 167 (Fig. 13) projecting inwardly from the walls of the casing to beneath the upper flanges 169 of the I-beams, the undersides of these flanges (as viewed in Fig. 13, being spaced from the peripheries of the adjacent rollers 91 with very small clearance so that they substantially contact therewith.

For hingedly connecting the members 63 of the clamping devices 59 to the members 61 thereof, which members 61 are welded to the tracks 55 of the upender, each member 61, as best shown in Fig. 8, is provided at its upper end with a portion 171 of reduced transverse thickness which fits within a slot 173 formed in the upper end of the associated member 63, a pin 175 being provided for hingedly connecting the member 63 to this reduced portion 171 of the member 61. As shown (see Figs. 6 and 8), the portion 171 of the member 61 fixedly carries a block 177 provided with a bore 179 in which is reciprocally carried a bolt 181 an end of which is adapted to project from the block and be received in the perforation 183 of either of the two lugs 185 fixedly carried by the member 63. The reciprocatory bolt 181, as shown, is provided with a stem 187 which extends through an opening 189 in the block 177 to its exterior where the stem is provided with an operating handle 191. Interiorly of the bore 179 the stem 187 is surrounded by a compression spring 193 which bears at one end against the bolt 181 and at its opposite end against the bottom of the bore so as normally to urge the bolt into its position shown by Fig. 8. When the member 63 is in its full line position shown by Fig. 6 the reciprocatory bolt 181, upon release of the handle 191, will enter the perforation 183 of one of the lugs 185 to hold said member in such position. When the handle 191 is operated to withdraw the bolt the member 63 may be swung upward into its dotted line position shown by Fig. 6 and the handle released to cause the bolt to enter the perforation of the other lug 185 and thus hold the member in that position.

For assisting in locking each member 63 against transverse movement relative to the tracks 55 of the cradle, particularly against downward movement when the cradle is in its fully upended position, each member 63 is shown as integrally provided with an elongated key 195 adapted to be received in a keyway 197 formed in the upper surface of the adjacent track 55.

It will be understood that each spool when wound with the coil may be extremely heavy, each weighing several tons. The present invention provides that when upending the coil the same need not in effect be lifted against the force of gravity, or that the extent of such lifting may be at a minimum. By so designing the parts that the horizontal axis about which the cradle rocks intersects the axis of the spool midway the length of the latter the spool, coil and cradle will be substantially statically balanced when the spool is clamped to the cradle with the parts in their positions shown by Fig. 1 provided the coil is centrally positioned with respect to the length of the spool, which condition will exist in any ordinary case. Under these conditions no lifting at all of the spool and coil against the force of gravity will be required in upending them, resulting in the upending operation requiring a minimum of power to perform it. In fact loaded spools weighing several tons may be quickly upended in this way with a power consumption well within that which can be exerted by a one-quarter horsepower electric motor.

It will be understood that within the scope of the appended claims wide deviations may be made from the construction described without departing from the spirit of the invention.

I claim:
1. An upender, for a spool of coil, comprising a supporting frame including an arcuate trackway, a cradle mounted in said frame on said trackway for tilting movement about a fixed horizontal axis from a spool receiving position, in which the spool is horizontal, to a spool upended position, the horizontal axis about which said cradle tilts from spool receiving position to spool upended position being normal to and intersecting the axis of the spool substantially midway its length in all positions of the cradle in its tilting movement whereby the center of gravity of the spool is positioned in said horizontal axis of tilting of the cradle in all such positions of the cradle, and cooperating means carried by the spool and cradle for releasably rotatably securing the spool to the cradle when the cradle is in its said spool receiving position, said cooperating means restraining the spool against movement relative to the cradle both axially and transversely of the spool whereby the spool of coil may be tilted with the cradle to upend the spool, the coil may be payed off the spool when the latter is upended, and the empty spool may be tilted by the cradle back to its horizontal position.

2. Strip handling apparatus according to claim 1 in which power means are provided for tilting the cradle, and locking means are provided for releasably engaging the spool in its upended position for restraining it from substantial movement therefrom while permitting it to rotate.

3. In a strip handling apparatus comprising a supporting frame including an arcuate trackway, a cradle mounted in said frame on said trackway, a spool adapted to be removably carried by said cradle, said cradle being mounted in said frame on said trackway for tilting movement about a fixed horizontal axis from a spool receiving position, in which the spool is horizontal, to a spool upended position, the horizontal axis about which the cradle tilts from spool receiving position to spool upended position being normal to and intersecting the axis of said spool substantially midway its length in all positions of the cradle in its tilting movement, whereby the center of gravity of the spool is positioned in said horizontal axis of tilting of the cradle in all such positions of the cradle, spool supporting means for each end of the spool, means for mounting the spool supporting means on the spool as a unit transportable therewith for relative axial rotation of the spool while restrained against substantial movement axially thereof, means carried by the cradle for securing said spool supporting means thereto when said cradle is in its said spool receiving position, said last-named means restraining said spool supporting means against substantial movement relative to the cradle both axially and transversely thereof.

4. Apparatus according to claim 3 in which power means are provided for tilting the cradle, and locking means are provided for releasably engaging the spool in its upended position for restraining it from substantial movement therefrom while permitting it to rotate.

5. Strip handling apparatus comprising a spool on which a coil of strip is adapted to be wound, means rotatably mounting on said spool adjacent its opposite ends wheels for supporting it, said wheels being positioned coaxial with the spool and restrained against substantial movement axially thereof, an upender for the spool comprising a cradle carrying a pair of spaced first tracks, means mounting said cradle for tilting movement about a horizontal axis parallel to the plane of said pair of tracks and from a first position in which such plane is positioned substantially horizontally to a second position in which it is positioned substantially vertically, a pair of spaced second tracks leading to said upender in alignment with the first tracks, respectively, when said plane is positioned horizontally, on which second tracks said wheels are adapted to be placed for supporting the spool and transporting it to said upender to place said wheels on said first tracks when said plane is so positioned, means carried by said first tracks for detachably securing said wheels thereto against movement longitudinally and transversely thereof when said wheels are so placed thereon to permit the spool to be upended by movement of the cradle from its said first position to its said second position and the coiled strip to be payed off the spool when the latter is upended.

6. Strip handling apparatus comprising a spool on which a coil of strip is adapted to be wound, means rotatably mounting on said spool adjacent its opposite ends wheels for supporting it, said wheels being positioned coaxial with the spool and restrained against substantial movement axially thereof, an upender for the spool comprising a cradle carrying a pair of spaced first tracks, means mounting said cradle for tilting movement about a horizontal axis parallel to the plane of said pair of tracks and from a first position in which such plane is positioned substantially horizontally to a second position in which it is positioned substantially vertically, a pair of spaced second tracks leading to said upender in alignment with the first tracks, respectively, when said plane is positioned horizontally, on which second tracks said wheels are adapted to be placed for supporting the spool and transporting it to said upender to place said wheels on said first tracks when said plane is so positioned, means carried by said first tracks for detachably securing said wheels thereto against movement longitudinally and transversely thereof when said wheels are so placed thereon to permit the spool to be upended by movement of the cradle from its said first position to its said second position and the coiled strip to be payed off the spool when the latter is upended, the said horizontal axis of tilting of the cradle being above said plane when the latter is positioned horizontally, and said wheels being of such diameters that the axis of the spool when secured to said first tracks substantially intersects said axis of tilting substantially midway the length of the spool.

7. Strip handling apparatus comprising a spool on which a coil of strip is adapted to be wound, means rotatably mounting on said spool adjacent its opposite ends wheels for supporting it, said wheels being positioned coaxial with the spool and restrained against substantial movement axially thereof, an upender for the spool comprising a cradle carrying a pair of spaced first tracks, means mounting said cradle for tilting movement about a horizontal axis parallel to the plane of said pair of tracks and from a first position in which such plane is positioned substantially horizontally to a second position in which it is positioned substantially vertically, a pair of spaced second tracks leading to said upender in alignment with the first tracks, respectively, when said plane is positioned horizontally, on which second tracks said wheels are adapted to be placed for supporting the spool and transporting it to said upender to place said wheels on said first tracks when said plane is so positioned, means carried by said first tracks for detachably securing said wheels thereto against movement longitudinally and transversely thereof when said wheels are so placed thereon to permit the spool to be upended by movement of the cradle from its said first position to its said second position and the coiled strip to be payed off the spool when the latter is upended, power means for moving the cradle selectively into its first and second positions, and locking means for releasably holding the cradle when the spool is mounted thereon against substantial movement from its said second position.

8. Strip handling apparatus according to claim 7 in which the locking means is adapted to engage the spool and permit axial rotation of the spool when it engages it.

9. Strip handling apparatus according to claim 7 in which the spool is formed with an axial end opening, the locking means comprising a vertically reciprocable bolt for removable reception in said opening.

10. Strip handling apparatus according to claim 7 in which the cradle is provided with an arcuate rack, the power means comprising a reciprocable fluid actuated piston, a rack reciprocated by said piston, and spur gearing connecting the last mentioned rack to said arcuate rack.

11. Strip handling apparatus according to claim 7 in which the cradle is provided with an arcuate rack, the power means comprising a reciprocable fluid actuated piston, a rack reciprocated by said piston, and spur gearing connecting the last mentioned rack to said arcuate rack, the spool being provided with an axial end opening, and the locking means comprising a vertically reciprocable fluid actuated bolt for removable reception in said opening.

12. Strip handling apparatus comprising a spool on which a coil of strip is adapted to be wound, an upender for the coil comprising a cradle tiltable about a horizontal axis from a spool receiving position, in which the axis of the spool is horizontal, to a spool upended position, cooperating means carried by the spool and cradle for releasably rotatably securing the spool to the cradle when the cradle is in its said spool receiving position; said cooperating means restraining the spool against substantial movement relative to the cradle both axially and transversely of the spool, the horizontal axis of tilting of the cradle lying in a vertical plane positioned between the ends of the spool when said spool is so secured to the cradle and the axis of the spool is horizontal; said cooperating means comprising wheels rotatably carried by the spool adjacent each of opposite ends thereof, respectively, and means on the cradle for releasably engaging said wheels; said means on the cradle comprising members fixedly carried by the cradle formed with concave surface portions for receiving said wheels for part of their circumferential extents and cooperating movable members formed with concave surface portions for receiving said wheels for another part of their circumferential extents, and means for releasably locking said members so engaging each wheel against relative movement for releasably retaining said wheel between them.

13. Strip handling apparatus comprising a spool on which a coil of strip is adapted to be wound, an upender for the coil comprising a cradle tiltable about a horizontal axis from a spool receiving position, in which the axis of the spool is horizontal, to a spool upended position, cooperating means carried by the spool and cradle for releasably rotatably securing the spool to the cradle when the cradle is in its said spool receiving position; said cooperating means restraining the spool against substantial movement relative to the cradle both axially and transversely of the spool, the horizontal axis of tilting of the cradle lying in a vertical plane positioned between the ends of the spool when said spool is so secured to the cradle and the axis of the spool is horizontal; said cooperating means comprising wheels rotatably carried by the spool adjacent each of opposite ends thereof, respectively, and means on the cradle for releasably engaging said wheels; said means on the cradle comprising members formed with concave surface portions for receiving said wheels for part of their circumferential extents, tracks fixedly carried by the cradle on which said members are fixedly mounted, on which tracks said wheels are adapted to roll for placing them against said concave surface portions, and other members operatively movably carried by the cradle and formed with concave surface portions for receiving said wheels for another part of their circumferential extents, and means for releasably locking said members so engaging each wheel against relative movement for releasably retaining said wheel between them.

14. Strip handling apparatus comprising a spool on which a coil of strip is adapted to be wound, means rotatably mounting on said spool adjacent its opposite ends wheels for supporting it, said wheels being positioned coaxial with the spool and restrained against substantial movement axially thereof, an upender for the spool comprising a cradle carrying a pair of spaced first tracks, means mounting said cradle for tilting movement about a horizontal axis parallel to the plane of said pair of tracks and from a first position in which such plane is positioned substantially horizontally to a second position in which it is positioned substantially vertically, a pair of spaced second tracks leading to said upender in alignment with the first tracks, respectively, when said plane is positioned horizontally, on which second tracks said wheels are adapted to be placed for supporting the spool and transporting it to said upender to place said wheels on said first tracks when said plane is so positioned, means for operatively fixedly detachably securing said wheels to said cradle when said wheels are so placed on said first tracks to permit the spool to be upended by movement of the cradle from its said first position to its said second position and the coiled strip to be payed off the spool when the latter is upended.

15. Strip handling apparatus comprising a spool on which a coil of strip is adapted to be wound, means rotatably mounting on said spool adjacent its opposite ends wheels for supporting it, said wheels being positioned coaxial with the spool and restrained against substantial movement axially thereof, an upender for the spool comprising a cradle carrying a pair of spaced first tracks, means mounting said cradle for tilting movement about a horizontal axis parallel to the plane of said pair of tracks and from a first position in which such plane is positioned substantially horizontally to a second position in which it is positioned substantially vertically, a pair of spaced second tracks leading to said upender in alignment with the first tracks, respectively, when said plane is positioned horizontally, on which second tracks said wheels are adapted to be placed for supporting the spool and transporting it to said upender to place said wheels on said first tracks when said plane is so positioned, means for operatively fixedly detachably securing said wheels to said cradle when said wheels are so placed on said first tracks to permit the spool to be upended by movement of the cradle from its said first position to its said second position and hte coiled strip to be payed off the spool when the latter is upended, the said horizontal axis of tilting of the cradle being above said plane when the latter is positioned horizontally, said wheels being of such diameters that the axis of the spool when said wheels are secured to the cradle substantially intersects said axis of tilting substantially midway the length of the spool.

References Cited in the file of this patent

UNITED STATES PATENTS

| | | |
|---|---|---|
| 364,855 | Ratekin | June 14, 1887 |
| 2,092,539 | Talbot | Sept. 7, 1937 |
| 2,205,563 | Johnstone | June 25, 1940 |
| 2,391,321 | Littell | Dec. 18, 1945 |
| 2,506,881 | Ligler | May 9, 1950 |